UNITED STATES PATENT OFFICE.

HENRY N. RITTENHOUSE, OF PHILADELPHIA, PENNSYLVANIA, ASSIGNOR TO HIMSELF AND ALFRED MELLOR, OF SAME PLACE.

IMPROVEMENT IN CHEWING-TOBACCO.

Specification forming part of Letters Patent No. 210,363, dated November 26, 1878; application filed October 19, 1878.

*To all whom it may concern:*

Be it known that I, HENRY N. RITTENHOUSE, of Philadelphia, Pennsylvania, have invented a new and useful Improvement in Chewing-Tobacco, of which the following is a specification:

In preparing tobacco for chewing purposes, it has been common to sweeten and impart a flavor to it by a decoction of licorice, which is either sprinkled over the leaves, so as to thoroughly saturate masses of the same, or bunches of leaves are dipped into the decoction.

While the licorice as usually prepared for this purpose imparts the desired flavor to the tobacco, it contains ingredients which promote molding, fermentation, and general deterioration; and the object of my invention is to obviate this by treating tobacco with a solution of licorice which does not contain any of these objectionable ingredients.

I boil the ordinary licorice-roots of commerce with water, in the usual manner, so as to obtain a decoction, which is properly strained, and with this decoction, while it is cold, I intimately mix an acid solution or a solution of acid salt, preferring, however, a solution of sulphuric acid.

On permitting this acidified solution to remain quiescent, a pasty precipitate will collect in the bottom of the vessel, and this precipitate I wash with cold water to remove any free acid, after which I add sufficient aqua-ammonia or other equivalent alkali to form a solution, which I term "ammoniacal glycyrrhizin," and which is ready for application to the tobacco-leaves in the same manner as the ordinary licorice solution.

By the process described of treating licorice, (which process, it should be understood, I do not claim,) those ingredients in the original decoction—such as starch and gelatinous, albuminous, resinous, and gummy matter—which promote the molding and other deteriorations of the tobacco are removed; hence it will be seen that by treating tobacco with the solution the latter serves to preserve, sweeten, and flavor the same.

The solution may be so evaporated that it will be reduced to a hard mass, which may be pulverized, and the glycyrrhizin may be applied to the tobacco in this pulverized condition; but I prefer to apply it in a liquid condition.

I claim as my invention—

As an improved chewing-tobacco, the combination of tobacco with glycyrrhizin, as and for the purpose set forth.

In testimony whereof I have signed my name to this specification in the presence of two subscribing witnesses.

HENRY N. RITTENHOUSE.

Witnesses:
ALEX. PATTERSON,
HARRY SMITH.